United States Patent
Guritz et al.

[15] 3,680,449
[45] Aug. 1, 1972

[54] AIRPORT RUNWAY SYSTEM

[72] Inventors: Kenneth E. Guritz, 570 Emerald Harbor Drive, Sarasota, Fla. 33577; John W. Magill, 643 S. Oak Knoll Ave., Pasadena, Calif. 91106

[73] Assignee: said Magill, by said Guritz

[22] Filed: March 19, 1970

[21] Appl. No.: 21,132

[52] U.S. Cl. ........................................94/4, 244/114
[51] Int. Cl. ..............................E01c 9/00, B64f 1/00
[58] Field of Search .................94/4; 244/114; 237/1

[56] References Cited

UNITED STATES PATENTS

| | | | |
|---|---|---|---|
| 2,505,622 | 4/1950 | McKee | 244/114 X |
| 2,570,226 | 10/1951 | Geiringer | 237/1 |
| 2,617,597 | 11/1952 | Bonilla | 237/1 |
| 2,634,659 | 4/1953 | Jordanoff | 94/4 |
| 3,213,581 | 10/1965 | Macchi | 52/577 X |
| 3,023,986 | 3/1962 | Nallinger | 244/114 |

FOREIGN PATENTS OR APPLICATIONS 493,176  5/1950  Belgium..........................244/114

*Primary Examiner*—Jacob L. Nackenoff
*Attorney*—John C. Albrecht

[57] ABSTRACT

An airport runway system wherein relatively large diameter tubular members are integrally cast in rigid pavement. At least some of the tubular members have openings in their upper surfaces and these openings extend through the pavement material to the pavement surface. The tubular members terminate in a source plenum at one end and in a combining plenum at their other end. The source plenum is connected through a valving system to a high capacity adjustable source of air, heat and vacuum. Valving within the source plenum associated with individual ones of the tubular members serves to control the utilization of the tubular members. Additionally, there are provisions for utilizing certain of the tubular members for the installation of services such as power along runway and taxiway pavements.

5 Claims, 6 Drawing Figures

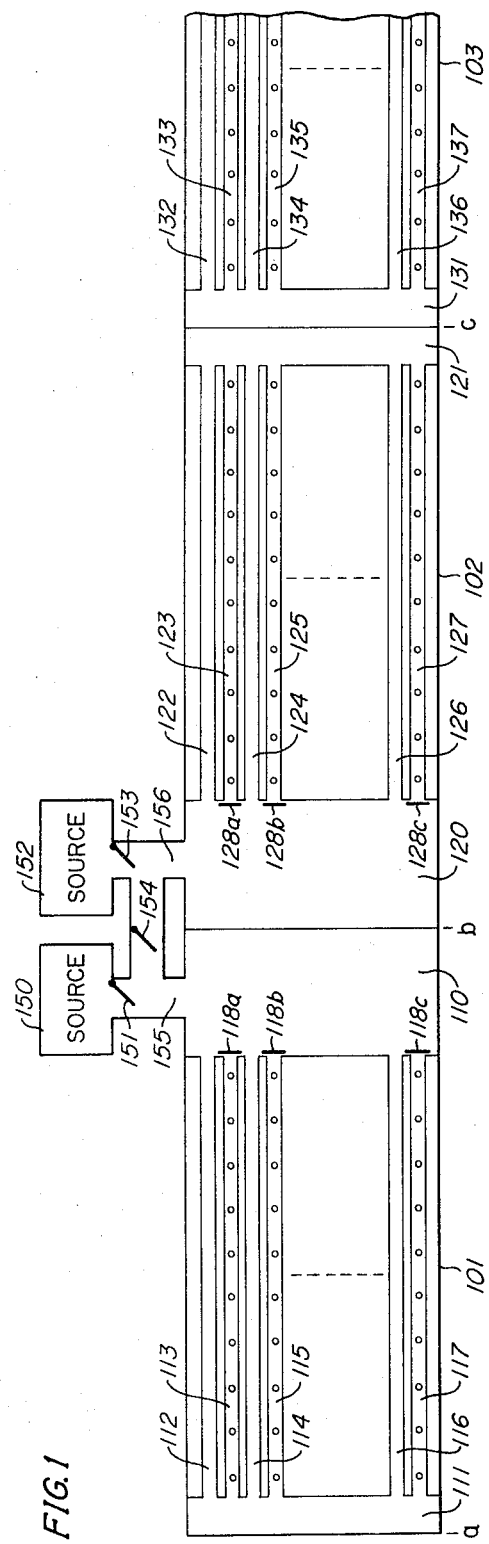
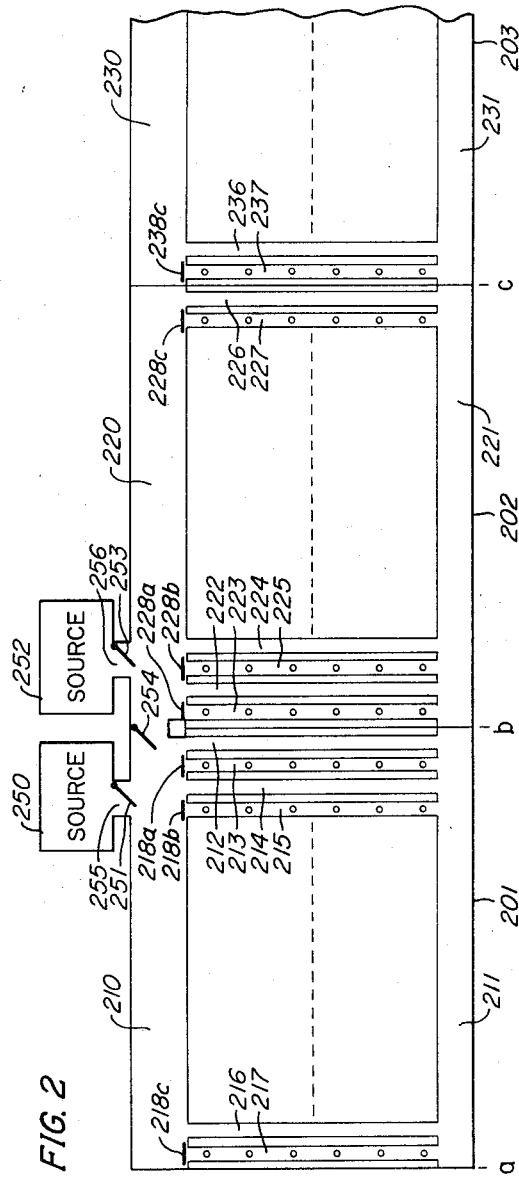

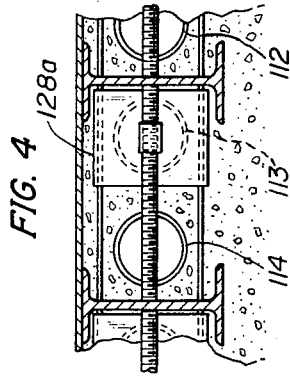
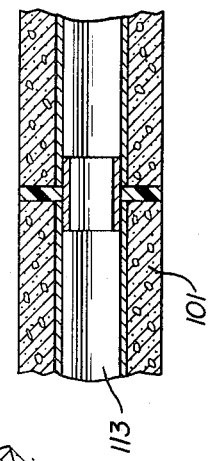
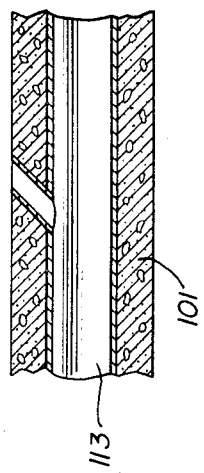
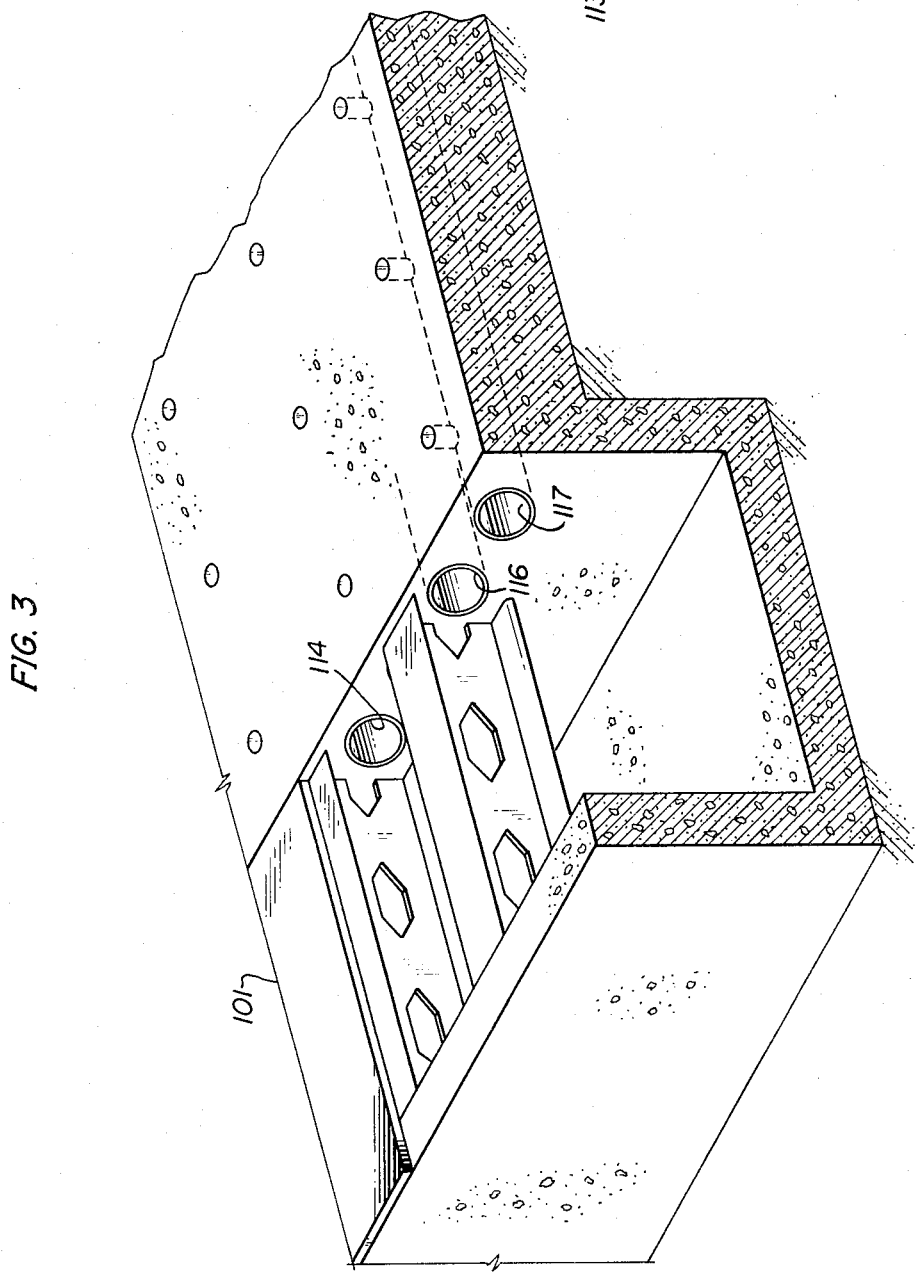

AIRPORT RUNWAY SYSTEM

FIELD OF INVENTION

This invention relates to commercial airports and, more particularly, to an improved airport runway system.

BACKGROUND OF INVENTION

Commercial aviation since its very beginning has undergone very substantial growth during each year. Aircraft technology has generally kept abreast of this growth and manufacturers are continuously striving to provide larger and more powerful passenger and cargo aircraft.

Airport facilities when designed are generally expected to have a useful life of at least ten to fifteen years without a requirement for a major modification or improvement. Seldom have the designers' expectations been realized. The growth of commercial aviation, both passenger and cargo, has generally far exceeded expectations and the owners of commercial airports are constantly adding both passenger and aircraft facilities.

An airport comprises a complex network of runways, taxiways and aprons. These surfaces, for purposes of discussion herein, are all termed "airport pavements". In the past, commercial airports have utilized flexible pavement and rigid pavement. Flexible pavement comprises an appropriate bed covered by a flexible surface consisting of a bituminous material. Rigid pavements are constructed of Portland cement concrete and depending upon the soil conditions may or may not comprise a base course. It is not unusual for an airport to comprise 50 miles or more of paved surface.

Heretofore runway pavement has been treated as a separate entity apart from other airport facilities. Runways, taxiways and aprons have been built taking into consideration good structural design practices. However, the installation of airport pavement as part of a total airport facilities system has not existed. Furthermore, airport pavement has been installed without any substantial concern for the reduction of hazards due to climatic conditions.

For example, where snow is prevalent in large quantities, runways, taxiways and aprons are cleared by large snow removal machines and often airports are closed for prolonged periods of time to permit the completion of snow removal.

Airports in many parts of the world are subject to severe fog conditions and in the absence of total aircraft landing guidance systems, an airport may be closed for many hours by fog.

It is an object of this invention to reduce the concrete required to construct airport pavement without reducing the desirable structural characteristics of such pavement.

It is another object of this invention to integrate airport facilities into airport paving.

It is another object of this invention to improve landing conditions.

It is another object of this invention to provide within an airport paving system facilities for removing ice and snow and for reducing fog.

It is another object of this invention to within an airport paving system provide passages for the installation of facilities such as power and communications cables.

SUMMARY OF INVENTION

An airport runway in accordance with our invention comprises a rigid course of Portland cement concrete or like material wherein a plurality of relatively large diameter tubular members are integrally cast within the concrete. The tubular members are laid substantially parallel to each other and certain of the members are provided with a series of openings in their upper surfaces. These openings extend through the concrete to the surface of the pavement. An airport runway is divided into modular segments, the length of a module being a function principally of the local climatic conditions and the pavement thickness. For example, where severe cold, ice and snow are encountered, the modular segments are shorter in length than in locations wherein a more moderate climate prevails. In one illustrative example of our invention, the tubular members are placed longitudinally along the runway and the tubular members of a paving section are terminated at one end in a source plenum and at the other end in a combining plenum. A large volume adjustable source of heat, air and vacuum is associated with each pavement section. Valving is provided in the source plenum to selectively effect a desired movement of air through the tubular members. The air which is moved in accordance with our invention may be utilized as explained later herein to prevent and to dissipate ice and snow accumulations on the pavement surface, to prevent and to dissipate fog lying above the pavement surface, and to generally improve landing conditions.

Our invention will be readily understood from the following detailed description which makes reference to the drawing, in which:

FIG. 1 is a schematic diagram of an airport runway system embodying our invention;

FIG. 2 is an alternate embodiment of an airport pavement wherein our invention is utilized;

FIG. 3 shows a section of an airport pavement and a source plenum;

FIG. 4 shows one illustrative valving arrangement for controlling the distribution of air;

FIG. 5 shows the joining of the tubular members at an expansion and contraction joint; and FIG. 6 illustrates an aperture in the concrete sloped along the length of the pavement.

DETAILED DESCRIPTION

Our invention will find its greatest application in relatively large commercial airports where continuity of airport operation is of significant importance. With the advent of very large commercial aircraft, there is a general requirement for longer, wider and heavier runways. As aircraft increase in size, it is within practical limits possible to add wheels and to thus distribute the impact over a larger aircraft footprint. However, even with such measures, it is necessary to provide airport pavement which adequately supports the loads imposed by the largest aircraft using the airport and to provide a firm, stable, smooth, all-year, all-weather surface. As the size of aircraft increases, rigid pavements are made thicker and as solid pavements are made thicker, additional supporting base must be provided. Under such conditions the savings in concrete and the improvements provided by our invention are of great importance.

A general understanding of our invention can be obtained by examination of the schematic diagram of FIG. 1. FIG. 1, which is not to scale, illustrates two complete runway segments 101, 102 and a portion of a third segment 103. The source plenum 110 for a first segment 101 and the source plenum 120 for the second segment 102 are shown adjacent to each other. Similarly, the combining plenum 121 for the second segment 102 and the combining plenum 131 for the third segment 103 are shown adjacent to each other. As will be explained more fully later herein, this orientation of segments permits the centralization of the sources 150 and 152 which serve the segments 101 and 102, respectively.

The tubular members 112 through 117, 122 through 127, and 132 through 137 are shown parallel to the length of the runway in FIG. 1. The remaining discussion herein will be with respect to this orientation of the tubular members. However, as can be seen in FIG. 2, such members may also be oriented along the width of the runway.

In accordance with our invention, substantial quantities of concrete may be saved in constructing runways by embedding our tubular members horizontally within the pavement. This saving conceivably lies in the order of 20 percent of the volume of the concrete in a solid slab of corresponding performance characteristics. From a performance standpoint, the pavement must be considered from the viewpoint of slab stiffness as well as flexural strength. On the basis of stiffness alone, a solid slab of depth $h_s$ and a perforated slab of depth $h_o$ having tubes of diameter $d$ are equivalent when $$h_s^3 = h_o^3 - d^3 \qquad 1$$

Accordingly, on the basis of stiffness alone, a 12-inch solid slab is equivalent to a 12.5 inch perforated slab having tubes six inches in diameter. For equal flexural strength, the following equation applies $$h_s^2/6 = h_o^3 - d_3/6h_o \qquad 2$$

Accordingly, a solid slab of 12 inches is equivalent to a perforated slab approximately 12.7 inches thick and having tubes six inches in diameter. Comparing a 12-inch slab with a 12.7 inch perforated slab having six-inch tubes on 15-inch centers, we find a saving of approximately 21 percent of the concrete of the solid slab.

In addition to this significant reduction in concrete requirements, improvements in landing conditions are effected through our invention. The sources 150 and 152 comprise adjustable large volume sources of unheated air, heated air and vacuum. These sources may, for example, be turbines or jet engines. The sources 150 and 152 are generally of a capacity to serve their respective runway segments. However, in the event of failure of one of the sources, the valving shown schematically as 151, 153 and 154 may be adjusted to utilize a single source, e.g., 150, with two segments, e.g., 101 and 102. Similarly, the source 152 may be utilized with the two segments 101 and 102. In accordance with our invention, it is contemplated that runway construction, except for the installation of our tubular members, e.g., 112, 113, will be carried out in accordance with the same good structural practices employed today. Accordingly, the airport pavement will be divided into appropriate subsections to provide for shrinkage and expansion of the slab. Additionally, keying or dowels may be employed between adjacent longitudinal subsections to provide lateral support. The tubular members, e.g., 112, may be of stiff but flexible material or of rigid material. Where our tubular inserts are employed, dowels may be eliminated between successive sections of runway. Where tubular members are employed, a slidable junction (see FIG. 6) may be employed to join the tubes in two adjacent sections. Accordingly, the successive sections are permitted to move independently of each other to accommodate expansion and contraction of the slab and hinging is provided between adjacent sections.

Without dwelling upon the structural aspects of a pavement in accordance with our invention, we will now describe the utilization of the sources 150 and 152 with their plenums, e.g., 120, 121, and the tubular members, e.g., 122, 123.

DISSIPATION OF SURFACE ICE AND SNOW

As seen in segment 102 of FIG. 1, alternate tubular members, e.g., 122, 123, are solid and perforated, respectively. It is contemplated that the source 152 will be controlled to provide a relatively low velocity supply of heated air which is introduced through the valve 153 to the plenum 120. The valves, e.g., 128a, 128b, shown in suggested detail in FIG. 4, are controlled so that the solid tubular members, e.g., 122, 124, are opened directly to the plenum 120, while the perforated members, e.g., 123, 125, are closed to the source plenum 120. Both the solid and perforated tubular members are directly open to the mixing or combining plenum 121. Accordingly, when surface ice or snow is being melted, hot air is circulated from the source 152 through the valve 153, the plenum 120 and the solid tubular members, e.g., 122, 124, to the combining plenum 121. This air is then forced down the perforated tubular members, e.g., 123, 125, where it is expended into the air. Although under optimum conditions the volume of the air and the heat is adjusted so that most of the heat is dissipated prior to exciting through the perforations of the members such as 123, 125, any residual heat which does escape with the air will serve to further dissipate ice and snow and to carry away the resulting vapors. As previously indicated, in the event that the source 150 were to fail, the valve 151 may be closed, the valves 153 and 154 opened, and the source 152 may then supply heated air to the segments 101 and 102.

DISSIPATION OF FOG

Fog is a serious hazard to airport operation. Accordingly, it must be quickly dissipated if continuous operation of the airport is to be maintained. Fog forms under a variety of climatic conditions and may be classified into two general categories, namely, warm fog and cold fog. Warm fog occurs at temperatures above 32° F and generally extends from the surface of the earth to several hundred feet above the earth. Cold fog occurs at temperatures below 32° F and is generally denser than warm fog and lies in a lower band of altitudes than warm fog. In accordance with our invention, warm fog is dissipated over a segment of runway, such as 102, by supplying a relatively large volume of warm air directly from the source plenum 120 to the perforated tubular members, e.g., 123, 125. That is, a large volume of warm air is supplied through the valve 153 and the plenum 120 directly to the tubular members 123, 125 by adjusting the valving, e.g., 128a, 128b, within the plenum 120 to connect the tubular members 123 and 125 with the plenum and to close the plenum 120 to the members, e.g., 122, 124. It is contemplated that a sufficient volume of air will be provided to build up a positive pressure within the plenum 120, the perforated members 123, 125, etc. and the combining plenum 121. Accordingly, the solid tubular members, such as 122, 124, will be filled with air. However, no steps need be taken to isolate them from the mixing plenum.

It is contemplated that in the dissipation of cold fog, the source 152 will be operated in reverse to draw a vacuum on the plenum 120 and to thus draw a vacuum above the surface of the perforated tubular members, e.g., 123, 125. As in the case of the dissipation of warm fog, the valving, e.g., 128a, 128b, within the plenum 120 is adjusted to connect the perforated tubular members, e.g., 123, 125, directly to the plenum 120 and to close the solid members 122, 124 to the plenum 120.

COUNTERING SURFACE WINDS

The arrangement shown in FIG. 1 with only a slight modification may be employed to counter the effect of surface winds to improve landing conditions above a runway. Although aircraft are today equipped with reverse thrust mechanisms and wheel brakes, it is often desirable to permit the landing of aircraft on a minimum length runway. Additionally, cross winds are hazardous. In accordance with our invention, the passages in the concrete surface which join the openings in the perforated tubular members are set at a relatively large angle, e.g., 45° from the normal towards the length of the runway. It is contemplated that in at least the end two or three runway segments, passages so directed may be advantageously employed to create winds along the length of the runway to counteract cross winds and to improve landing conditions. The source 152 is controlled to provide a high capacity vacuum directly to the perforated tubular members, e.g., 123, 125, by adjusting the valves to open these members directly to the plenum 120 and to close the solid members to the plenum 120.

INTEGRATION OF SERVICES

FIGS. 1 and 2 show our invention only in schematic form. As indicated earlier herein, our invention is part of a "system" approach to the provision of airport pavement as a cooperating portion of the entire airport facilities system. Further, in accordance with our invention, our tubular members may be advantageously employed to carry airport services, such as electrical power lines, communications lines and cables and fuel, by way of example only. Additionally, since we provide perforations from the surface to certain of our tubular members, it is contemplated that liquid run-off, particularly water, may accumulate in the tubes. Therefore, it is our intention to provide for the disposition of such liquids through sumps which may advantageously be located in our source or combining plenums.

Furthermore, it is recognized that through years of use and exposure to the elements, it may be necessary to add a finish course on top of airport pavement constructed in accordance with our invention. The presence of our tubular members, and particularly the perforations which run between certain of our tubes and the pavement surface, will not interfere with the application of such added surfaces. Prior to pouring the added surface, plastic tubes or dowels may be inserted in our perforations and the concrete poured to the desired depth. If plastic tubes are employed, it is contemplated that each tube will have its upper end closed to prevent the pouring of concrete into the perforated tubes. In this case, the closed ends must be opened prior to their use, as described earlier herein. In the event that solid dowels or plugs are employed, these may be of a firm but deformable material which will permit for ready removal once the top surface of concrete has hardened.

This discussion is intended to show but illustrative examples of services which may be advantageously incorporated within airport pavement and it is to be understood that other facilities which must be distributed throughout the airport may also be carried through our tubular members.

Additionally, where climatic conditions do not require the prevention or removal of accumulations of ice, snow, fog, etc., our tubular members may be used to advantage to conserve concrete. In which case the tubular members may be hollow or of a solid light weight material such as molded plastic beads. In either case, the tubular members may be held in alignment at the desired depth in the pavement by means of simple wire chairs and ties.

What is claimed is:

1. An improved airport runway pavement segment comprising: a horizontal concrete body having a length, a width and a depth and comprising a substantially horizontal pavement surface;

first and second plenum means located at and in abutting relation with the opposite ends of the length of said body respectively, said plenum means each comprising a substantially horizontal pavement surface in horizontal alignment with said pavement surface of said body;

an adjustable large volume source of air operatively coupled to said first plenum means;

a plurality of relatively large diameter, long, tubular members integrally cast within said body, said members being disposed substantially parallel to each other on approximate equal centers in a substantially horizontal plane, the opposite ends of said tubular members being coupled respectively to said first and said second plenum means;

certain of said tubular members are perforated in a relatively regular pattern along their length and said body comprises a plurality of passages extending from said perforations through said pavement surface; and said first plenum means further comprises valve means for selectively decoupling said tubular members from said first plenum means.

2. An improved airport runway in accordance with claim 1 wherein said adjustable source of air further comprises an adjustable large volume source of heat.

3. An improved airport pavement segment in accordance with claim 1 wherein said source of air is reversible whereby said source draws its input air from said coupled plenum means and said tubular members.

4. An improved airport pavement segment in accordance with claim 1 wherein at least certain of said passages from said perforations to said pavement surface are substantially parallel to each other and intersect the plane of said pavement surface at an angle substantially less than 90° whereby said passages are directed upwardly and along the length of said section.

5. An improved airport runway comprising:
a plurality of substantially similar segments, each of said segments comprising:
a horizontal concrete body having at least a first end, a second end and a substantially horizontal pavement surface;
first and second plenum means located at and adjacent to said first and said second ends respectively, said plenum means each comprising a substantially horizontal pavement surface in horizontal alignment with said pavement surface of said body;
an adjustable large volume source of air operatively coupled to said first plenum means; and
a plurality of relatively large diameter, long, tubular members integrally cast within said body, said members being disposed substantially parallel to each other on approximate equal centers in a substantially horizontal plane, the opposite ends of said tubular members being coupled respectively to said first and said second plenum means; and
wherein said segments of said runway are disposed in an ordered pattern wherein the first plenum means of two adjoining segments are disposed adjacent to each other with their corresponding pavement surfaces in horizontal alignment with each other, and separate valve means are provided for selectively coupling and decoupling said source of air of one segment to said first plenum means of another adjacent segment whereby each said source may be selectively operatively coupled to said first plenum means of two adjacent segments.

* * * * *